United States Patent
Murthy et al.

(10) Patent No.: US 10,460,010 B2
(45) Date of Patent: Oct. 29, 2019

(54) COMPUTING SCENARIO FORECASTS USING ELECTRONIC INPUTS

(71) Applicant: ORACLE FINANCIAL SERVICES SOFTWARE LIMITED, Mumbai (IN)

(72) Inventors: Bhanu Prashanthi Murthy, Bangalore (IN); Lakshmi Narayana Pedapudi, Bangalore (IN); Aravind Venketaraman, Bangalore (IN); Kiran Jagannath, Bangalore (IN); Ranveer Desai, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 526 days.

(21) Appl. No.: 15/201,871

(22) Filed: Jul. 5, 2016

(65) Prior Publication Data

US 2018/0011952 A1 Jan. 11, 2018

(51) Int. Cl.
| | |
|---|---|
| *G06Q 40/06* | (2012.01) |
| *G06F 17/18* | (2006.01) |
| *G06Q 10/04* | (2012.01) |
| G06Q 30/02 | (2012.01) |
| G06Q 40/00 | (2012.01) |

(52) U.S. Cl.
CPC ............ *G06F 17/18* (2013.01); *G06Q 10/04* (2013.01); *G06Q 40/06* (2013.01); G06Q 30/0202 (2013.01); G06Q 40/00 (2013.01)

(58) Field of Classification Search
None
See application file for complete search history.

(56) References Cited

U.S. PATENT DOCUMENTS

| | | | | |
|---|---|---|---|---|
| 5,930,762 | A * | 7/1999 | Masch | ............... G06F 17/10 705/7.28 |
| 7,590,937 | B2 * | 9/2009 | Jacobus | ............... G06Q 40/06 715/700 |
| 8,499,066 | B1 * | 7/2013 | Zhang | ............... H04L 47/823 709/223 |
| 10,102,855 | B1 * | 10/2018 | Sindhwani | ............... G10L 15/22 |
| 2004/0068454 | A1 * | 4/2004 | Jacobus | ............... G06Q 10/087 705/36 R |

(Continued)

*Primary Examiner* — Kibrom K Gebresilassie
(74) *Attorney, Agent, or Firm* — Kraguljac Law Group, LLC (57) ABSTRACT

Systems, methods, and other embodiments associated with computing scenario forecasts according to electronic inputs are described. In one embodiment, a method includes, in response to receiving a signal that triggers data collection, collecting electronic data from one or more electronic databases by aggregating the electronic data into data structures of a processing table. The electronic data defines historic values of a set of instruments. The method also includes computing projected values for each of the set of instruments according to correlations identified in the historic values. The projected values form primary forecasts that model expected future values of the set of instruments. The method includes, in response to receiving electronic inputs including scenario variables of a scenario that affects the primary forecasts, generating scenario forecasts for the set of instruments according to the scenario variables and the projected values to identify how the scenario influences the primary forecasts.

17 Claims, 3 Drawing Sheets

(56) References Cited

U.S. PATENT DOCUMENTS

| | | | |
|---|---|---|---|
| 2004/0068455 A1* | 4/2004 | Jacobus | G06Q 40/06 705/36 R |
| 2004/0095237 A1* | 5/2004 | Chen | G06F 11/0748 340/506 |
| 2007/0005403 A1* | 1/2007 | Kennedy | G06F 19/328 705/4 |
| 2010/0023460 A1* | 1/2010 | Hughes | G06Q 40/06 705/36 R |
| 2011/0060703 A1* | 3/2011 | Alaniz | G06K 9/00496 706/12 |
| 2012/0023035 A1* | 1/2012 | Kuhnle | G06Q 40/04 705/36 R |
| 2012/0143633 A1* | 6/2012 | Salghetti | G06Q 40/08 705/4 |
| 2014/0095372 A1* | 4/2014 | Nash | G06Q 40/04 705/37 |
| 2014/0136353 A1* | 5/2014 | Goldman | G06Q 20/405 705/21 |
| 2014/0279688 A1* | 9/2014 | Ginsberg | G06Q 40/06 705/36 R |
| 2016/0035024 A1* | 2/2016 | Yin | G06Q 40/04 705/37 |
| 2016/0219563 A1* | 7/2016 | Sayeed | H04L 1/0007 |
| 2016/0260052 A1* | 9/2016 | Ray | G06Q 10/087 |
| 2017/0024728 A1* | 1/2017 | Bull | G06Q 40/10 |

* cited by examiner

COMPUTING SCENARIO FORECASTS USING ELECTRONIC INPUTS

BACKGROUND

Analyzing how different scenarios may impact present values of financial instruments can be a complex task. Approaches may include manually gathering information for each separate financial instrument to determine past values. Thereafter, each separate instrument is, for example, independently assessed. However, manually gathering the information and individually assessing each instrument is tedious and time-consuming, while also constraining the ability to analyze impacts between the instruments.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that implement electronic scenario forecasting according to electronic inputs. For example, as part of daily operations, a computing system electronically acquires and stores a vast amount of electronic data in different databases. The electronic data relates to transactions, accounts, profits, losses, interest rates and other information for each of many different accounts. However, because the data is so vast, manually gathering relevant information, identifying relationships in the information and using the information in a meaningful way may not be feasible. Therefore, in one embodiment, computerized systems are provided that overcome these difficulties. For example, a computerized system is implemented to identify relevant data automatically, collect the relevant data in a central electronic repository, apply electronic algorithms to identify trends from the electronic data, and generate forecasts according to the trends.

Consequently, electronic variables defining different scenarios that influence the instruments can be electronically generated from the centrally stored data and forecasts. In one embodiment, future values of the electronic variables are defined according to electronic inputs received from interactions by a user with a computing system. Thus, providing the forecasts in electronic form further permits electronically modifying/adjusting the forecasts in real-time according to the electronic inputs. This real-time forecasting provided for by the computerized system permits analyzing and comparing many different "what-if" circumstances that characterize how different scenarios affect the instruments. Thus, the disclosed computerized systems permit useful applications of the electronic data by collecting and transforming the electronic data into scenario forecasts for comparison and use as decision-making tools to assess risk and profitability relating to various financial instruments.

Figure 1:
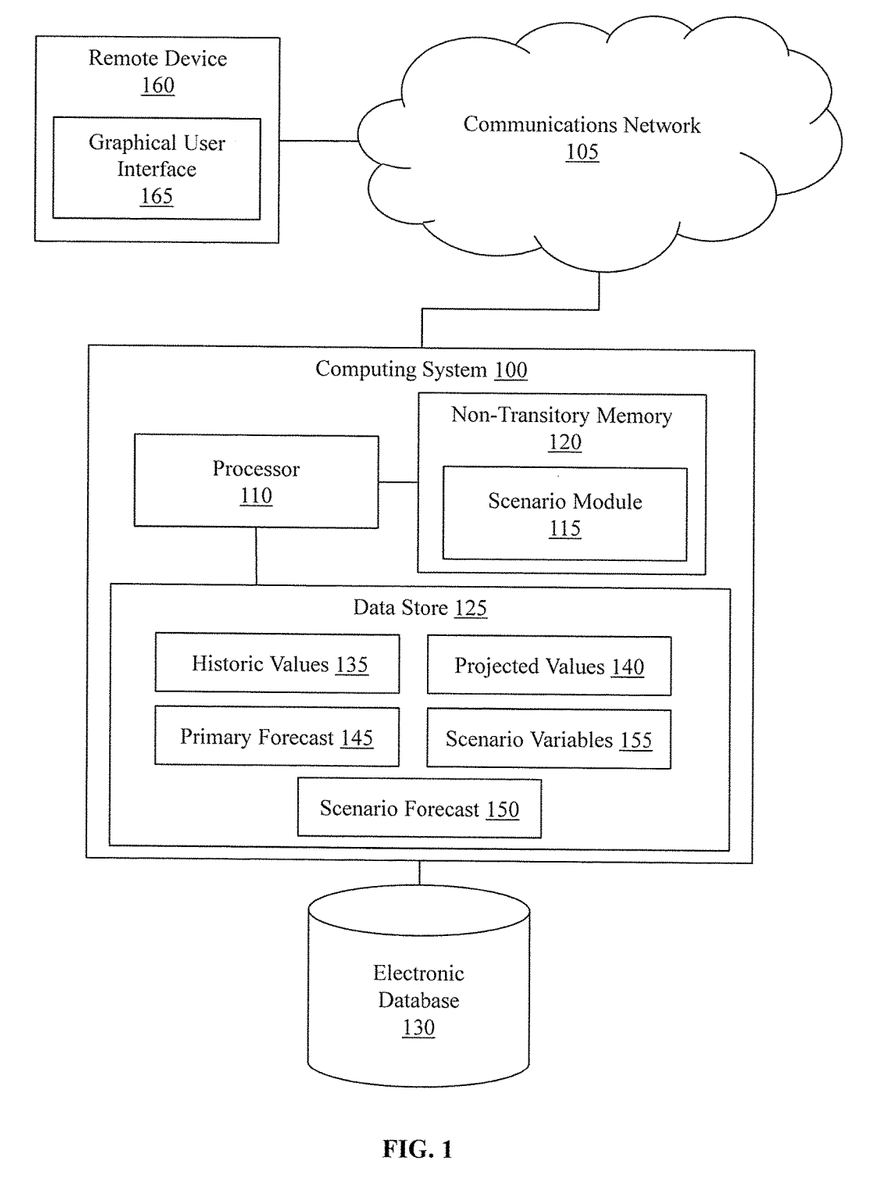
FIG. 1 illustrates one embodiment of a system associated with computing scenario forecasts according to electronic inputs.

With reference to FIG. 1, one embodiment of a computing system 100 associated with electronically computing scenario forecasts is illustrated. In one embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, or another type of networked computing solution. In one embodiment, the computing system 100 is a centralized server-side application that provides at least the functions disclosed herein and that is accessed by many users via computing devices/terminals communicating with the computing system 100 (functioning as the server) over a computer communications network 105.

In one embodiment, one or more of the components described herein are configured as program modules stored in a non-transitory computer-storage medium. The program modules are configured with instructions that when executed by at least a processor 110 cause the computing system 100 (e.g., personal computer, server, etc.) to perform the corresponding function(s).

For example, the computing system 100 includes a scenario module 115 stored in a non-transitory memory 120 that is communicably coupled to the processor 110. In one embodiment, the scenario module 115 in combination with at least the processor 110 receives electronic communications from over the electronic communications network 105, analyzes and transforms the electronic communications into electronic data structures in a data store 125 and/or an electronic database 130, and generates and modifies electronic data structures in the electronic database 130 and/or the data store 125 according to disclosed functions.

Additionally, the scenario module 115 generates electronic data structures including different forecasts that may be stored in the data store 125 or the electronic database 130 so that the forecasts may be subsequently compared. For example, the forecasts may be compared upon being transmitted electronically and displayed on a remote device (e.g., remote device 160) using a graphical user interface 165 displayed on a display screen. Thus, the disclosed functions are rooted in computer technology to achieve the ability to compute and modify the forecasts as disclosed. Consequently, the scenario module 115 is tied to the computing system 100 to cause the computing system 100 to perform various novel functions as described herein.

FIG. 1 further illustrates the computing system 100 including the processor 110, which is a hardware processing unit such as a microprocessor, central processing unit (CPU), application-specific integrated circuit (ASIC), or similar hardware device. The processor 110 is connected via circuitry (e.g., a bus) to the non-transitory memory 120 and the data store 125. The non-transitory memory 120 is, for example, a processor cache memory, a flash memory, a random access memory (RAM), or another memory that stores instructions executed by the processor 110 that comprise the scenario module 115.

Similarly, the data store 125 is, for example, a memory such as a random access memory (RAM), flash memory, hard-disk drive or similar volatile or non-volatile computer-storage medium. Accordingly, the processor 110 uses the data store 125 to store various data when performing the disclosed functions. As shown in FIG. 1, the data store 125 stores historic values 135, projected values 140, primary forecasts 145, scenario forecasts 150, and scenario variables 155. Additional aspects of the various elements of the electronic data itself will be discussed further in relation to specific functions of the scenario module 115 subsequently.

Alternatively, or additionally, the scenario module 115 controls the processor 110 to create one or more database tables in the electronic database 130 to store the various elements illustrated as being stored in the data store 125. In general, the scenario module 115 persists data in tables of the electronic database 130 while exploiting the data store 125 for operational storage when, for example, actively accessing the data to generate forecasts and/or perform other functions.

Furthermore, while the electronic database 130 is illustrated as being directly connected to the computing system 100, the electronic database 130 may alternatively be connected through the communications network 105 and be provided as cloud storage or remote storage. In either case, the computing system 100 includes communications hardware (not shown) such as a network interface controller (NIC), cellular radio, or another device for transmitting and receiving data between the communications network 105.

Accordingly, in one embodiment, the communications network 105 is a cellular network, the Internet, a wireless network, a wide area network (WAN), or another communications network that provides data between the computing system 100 and additional computing devices (e.g., the remote device 160). The remote device 160 is, for example, a client terminal that accesses the computing system 100 as a diagnostic tool to cause scenarios depicting "what-if" circumstances to be generated. In one embodiment, the remote device 160 is a laptop computer, desktop computer, terminal device, or another computing device that electronically interacts with the computing system 100 via the communications network 105.

Figure 2:
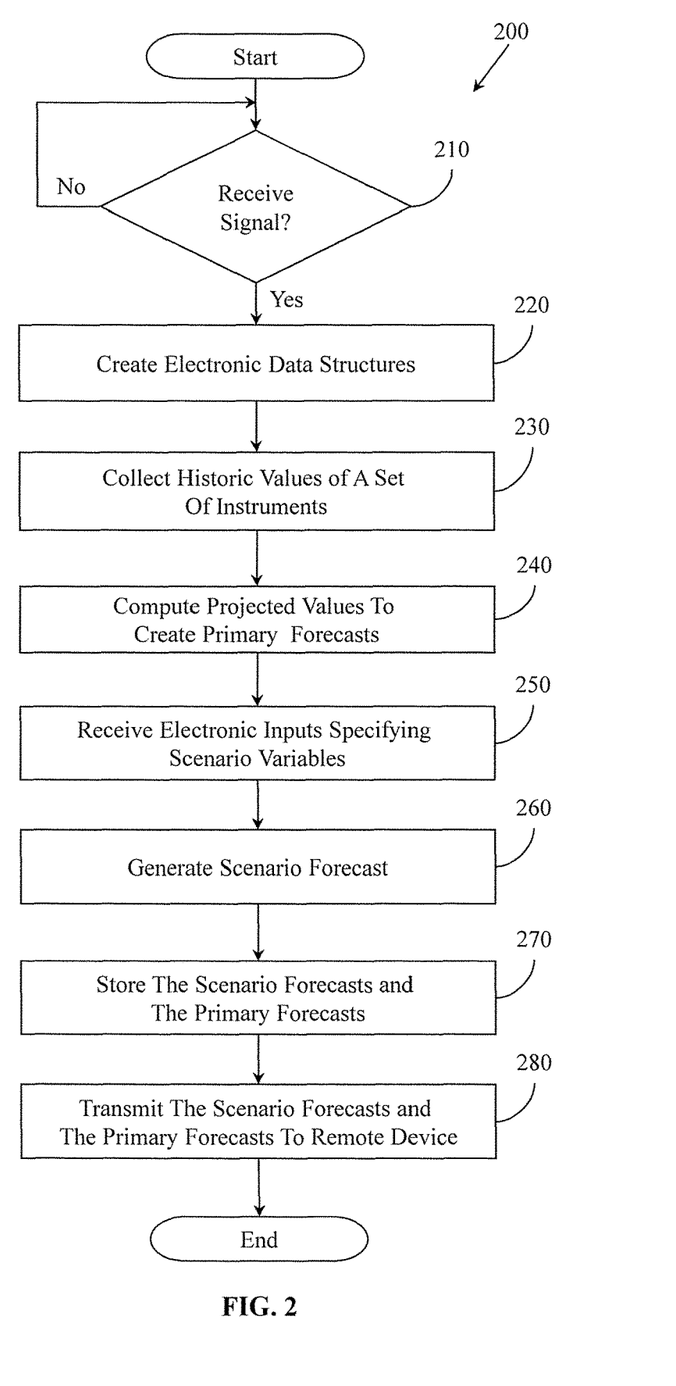
FIG. 2 illustrates one embodiment of a method associated with collecting historic values for a set of instruments and projecting future values according to electronic inputs.

Further discussion of the scenario module 115 and how the primary forecasts and scenario forecasts are computed will be discussed subsequently in relation to method 200 of FIG. 2. FIG. 2 illustrates one embodiment of method 200 which is associated with computing scenario forecasts according to electronic inputs. For purposes of simplicity in this discussion, method 200 will be discussed from the perspective of the computing system 100. That is, the scenario module 115 implements the method 200 as a step-by-step computerized algorithm to achieve the described functions. Of course, while discussed in a step-by-step manner, some of the blocks (e.g., 210-240) may be executed as a batch process on multiple sets of data.

Method 200 initiates at 210 when, for example, the computing system 100 receives a signal that triggers the processor 110 to proceed with method 200. In one embodiment, the trigger signal is a request for one or more forecasts and is provided over the communications network 105 to the computing system 100. Thus, the computing system 100 receives, decodes, buffers and stores information from the signal, at 210. In general, the signal is provided by a remote device (e.g., remote device 160) as a request for the one or more forecasts. Alternatively, the signal may be provided locally from within the computing system 100. Additionally, the signal received, at 210, in one embodiment, is a signal initiating a batch process for producing the primary forecasts 145 by performing 210, 220, 230 and 240 as a batch in relation to multiple requests for different sets of forecasts that operate on multiple sets of data.

Furthermore, in addition to receiving the triggering signal/request at 210, the computing device 100, in one embodiment, parses the request to identify attributes of the request. For example, the request may include attributes indicating different characteristics for how the forecasts are to be generated or otherwise formatted. In one embodiment, the attributes include a subject instrument for which forecasting is to occur, a selection of one or more accounts (e.g., customer account(s)), a type of forecasting (e.g., deterministic, stochastic, etc.) and so on. In either case, receiving the signal at 210 causes the computing system 100 to initiate the method 200.

At 220, electronic data structures are created for storing information that is to be collected and/or generated subsequently. In one embodiment, the processor 110 creates one or more database tables in the data store 125 and/or in the electronic database 130. For example, the processor 110 generates an electronic data structure, at 220, by generating pointers, dynamically allocating memory space and initializing data elements that comprise the electronic data structure. In one embodiment, the scenario module 115 causes the processor 110 to generate data structures in the data store 125 in the form of a processing table for storing data (e.g., the historic values 135, the projected values, etc.) while performing the method 200.

Once the data structures are generated, at 220, the historic values 135 are collected for a set of instruments. The set of instruments provide a manner of measuring performance of the account. That is, the set of instruments indicate profitability for the account according to changes in values of the instruments over a history of the account. Thus, the set of instruments is used as a measure for assessing profitability of the account in relation to different likely risks that are applied as discussed subsequently.

The set of instruments are, for example, financial instruments, such as, (i) interest expenses, (ii) interest income, (iii) net credit losses, (iv) non-interest income, (v) operating expenses, (vi) other revenue, (vii) transfer pricing charge, (viii) transfer pricing credit. Of course, while the preceding eight instruments are explicitly listed for purposes of discussion, different instruments may be substituted as measures for an associated account.

Furthermore, values of the set of instruments that comprise the historic values 135 are generally collected in relation to a specific account associated with an individual or business. Of course, in one embodiment, the computing system 100 may aggregate electronic data for many different accounts and compute forecasts for the accounts together in a batch process to provide a more robust forecast. However, for purposes of simplicity in this discussion reference will be to a single account.

Accordingly, the scenario module 115 collects the historic values 135 according to identifying information (e.g., account ID(s)) specified in the request from 210. In one embodiment, the scenario module 115 controls the processor 110 to collect the historic values 135 by scanning local and/or remote sources (e.g., the electronic database 130), identifying electronic data as the historic values 135 by comparing the account ID, retrieving the electronic data, and aggregating the electronic data into the processing table stored in the data store 125. In this way, the complex task of searching through large electronic data stores for appropriate electronic data is streamlined in a single process.

In general, the historic values 135 are past values for each of the different instruments in the set of instruments. That is, the historic values 135 embody a history of values for each different instrument over a period of time (e.g., two years). Furthermore, the electronic data that comprises the historic values 135 may be stored and, thus, retrieved at different levels of granularity depending on, for example, a specified level of scrutiny and/or availability of data for an associated account.

Consider that data may be available in varying levels of granularity for each financial instrument defined in the set of instruments. For example, for purposes of discussion, consider that the data is available in hourly increments for a history of each instrument. That is, data about historic values for each instrument is stored in hour increments for a history of the instrument with the account. However, such fine granularity may not be desired when, for example, the forecasting is to occur over a span of years (e.g., 2 years). Thus, the scenario module 115 causes electronic data for each of instruments to be collected according to a particular time series. That is, the electronic data is collected at intervals of a day or month depending on the request and for a span of time that is sufficient to extrapolate into a forecast. The interval of the data in combination with the span of time for which the data is collected is referred to as a time series for the data.

Furthermore, in some instances, desired data may not be available for a sufficient span of time for reasons such as an account being newly opened and, thus, a requisite history is simply not available. Thus, several different categories may be specified for collecting the data.

In one embodiment, electronic data is classified into one of the three following categories. The categories include (i) sufficient data that spans at least a first defined period of time (e.g., two years), (ii) adequate data that spans at least a second defined period of time (e.g., 6 months), and (iii) inadequate data that spans a time less than the second defined period of time (e.g., <6 months). The first category (i) represents an amount of data that is desirable for use as an input in order to provide, for example, more accurate forecasts. The second category (ii) represents a minimum amount of data for producing a forecast while the third category (iii) represents an insufficient amount of data for generating a forecast without obtaining supplemental data. Thus, depending into which category the scenario module 115 classifies the collected data, the collected data may be modified using, for example, supplemental data.

That is, for example, if the account has data that spans more than six months but less than 24 months and, thus, the data is classified in category (ii), then additional electronic data is identified and collected as a supplement to the data of the account. Accordingly, as part of collecting data, at 230, the scenario module 115 controls the processor 110 to classify the electronic data and, if necessary, collect additional data according to demographic criteria or other criteria that sufficiently identifies supplemental data. Furthermore, if the account includes data that spans, for example, less than a minimum threshold (e.g., 6 months), then the account data is ignored, and supplemental data is used in place of the account data according to demographic criteria.

The demographic criteria characterizes expected trends in the original data that is being supplemented. Thus, data that conforms with the demographic criteria is used to supplement the retrieved electronic data, since the conforming data should include similar trends.

For example, the scenario module 115 assesses demographic criteria including: (i) whether the supplemental data belongs to a same market demographic segment as the original data, (ii) whether accounts identified as being part of the same market segment include at least two years of data, and (iii) whether accounts identified as qualifying under criteria (i) and (ii) are active. If data is identified that qualifies under the specified criteria, then the scenario module 115 may use the supplemental data to generate the forecasts.

As previously noted, using the supplemental data may include using the supplemental data in addition to available original data (i.e., category ii) or using the supplemental data while discarding the original data (i.e., category iii). How the supplemental data is applied in relation to any available original data is implementation specific and may be determined according to variables specified in the request from 210.

Accordingly, at 240, the projected values 140 are computed to generate primary forecasts 145 from the collected historic values 135. In one embodiment, the scenario module 115 causes the processor 110 to use the historic values 135 collected at 230 as an input to one or more computerized algorithms. Thus, at 240, the scenario module 115 executes the computerized algorithms to extrapolate the historic values 135 into the projected values 140.

In one embodiment, executing the computerized algorithms includes analyzing the historic values 135 to identify correlations between values for each of the instruments, training a model according to the identified correlations to produce characteristic coefficients, and calculating the projected values 140 by applying the trained model to the historic values 135. In this way, the scenario module 115 causes the processor 110 to compute the projected values 140.

In general, the computed characteristic coefficients may be generated in several different ways. For example, the scenario module 115 is configured to implement computerized algorithms such as an autoregressive integrated moving average (ARIMA) model. In one embodiment, the ARIMA model is an ARIMA (p, d, q) model that predicts future data points (the projected values 140) in a time series for each of the instruments. In general, the projected values 140 are provided for a defined period of time (e.g., two years into the future) in order to provide an adequate forecast for assessing future profitability and risks associated with each of the instruments.

As a result of applying the computerized algorithms, at 240, the projected values 140 are stored in the data store 125. Additionally, at 240, the primary forecasts 145 are generated. The primary forecasts 145 may take several different forms. For example, the scenario module 115 combines the projected values 140 with at least a portion of the historic values 135 to create a graph displaying values for the set of instruments over the time series as the primary forecast 145. Thus, the primary forecasts 145 are formed from the projected values 140 and the historic values 135 (i.e., past values) of the set of instruments.

The primary forecasts 145 represent forecasted values of the set of instruments for a present context. Computing, at 240, according to the present context does not apply effects of possible future scenarios. Instead, the computed primary forecasts 145 are as though the set of instruments continue unaffected by any additional outside influences (e.g., economic recession, interest rate changes, etc.). Thus, the calculated coefficients that characterize the historic values of the set of instruments relate to past trends in the values that are extrapolated forwarded, at 240.

However, at 250, electronic inputs are received that include scenario variables 155 which define a scenario 150 that affects the primary forecasts 145. That is, the scenario variables 155 introduce outside influences that affect values of the set of instruments. Accordingly, in one embodiment, the scenario module 115 controls the processor 105 to receive the scenario variables 155 by identifying an electronic signal that indicates the arrival of the variables 155, receiving packets of a communication, decoding the communication, buffering and storing the communication that includes the scenario variables 155.

The scenario variables 155 are, for example, electronic data inputs stored in electronic data structures that represent stressors on the set of instruments. That is, the scenario variables 155 generally define one or more events that may affect values of the set of instruments as projected within the primary forecasts 145. For example, the scenario variables 155 may indicate how changes in a federal interest rate affect values of the set of instruments (e.g., interest rates of consumer credit card, etc.) by modifying an interest income variable from the scenario variables 155. Other examples of influences that may be embodied in the scenario variables 155 include stock exchange events, changes in exchange rates, and other economic, geopolitical, and/or other events that influence values of the set of instruments. Additionally, the scenario variables 155 may also indicate effects of multiple events. That is, the scenario variables 155 may account for influences of multiple different events that are to be applied to the primary forecasts 145.

Furthermore, the scenario variables 155 are generally provided to the computing system 100, at 250, by the remote device 160 in order to invoke the scenario module 115 to produce one or more scenario forecasts 150.

Thus, in response to the scenario variables 155, at 260, the scenario forecast 150 is generated. In one embodiment, the scenario variables 155 are applied by the scenario module 115 to the primary forecasts 145 to alter how the projected values 140 are extrapolated over the time series. In this way, different scenarios can be electronically input to the computing system 100 to identify influences of the scenarios on the set of instruments. For example, in one embodiment, generating the scenario forecasts, at 260, includes modifying the coefficients determined at 240, extrapolating values of each instrument individually using the modified coefficients, extrapolating effects of interdependencies between the set of instruments, and storing scenario forecasts produced from the extrapolating.

To better understand how the scenario forecasts 150 are generated, briefly consider how the projected values 140 were computed at 240. The projected values 140 are extrapolated from the historic values 135 according to a present context. The previously discussed coefficients embody the present context and are thus applied to the historic values 135 using the computerized algorithm (e.g., ARIMA model). However, at 260, a context of the forecasting is modified by the theoretical occurrence of a scenario that is embodied in the scenario variables 155.

Therefore, the scenario module 115 causes the processor 105 to modify coefficients determined at 240 according to the scenario variables 155. Consequently, the scenario module 115 executes the computerized algorithm (e.g., ARIMA model) using the newly projected values according to the scenario variables 155 and values that forecast influences of the scenario are output for the set of instruments. Thus, generating the scenario forecasts, at 260, provides altered forecasts (i.e., altered primary forecasts 145) that illustrate how the scenario modifies values of the primary forecasts 145.

Additionally, in further embodiments, the scenario variables 155 may also specify particularities of how the scenario forecasts 150 are to be generated. For Example, the scenario forecasts 150 may be generated using a deterministic or stochastic computerized algorithm as implemented by the scenario module 115 along with the processor 110. Accordingly, the scenario module 115 causes the processor 110 to extrapolate values using the deterministic algorithm by individually and separately analyzing each of the different instruments and generating values from the individual analysis without consideration of interdependencies between the set of instruments. That is, changes in values of an instrument that result from applying the scenario and that may affect values of another instrument are not considered when extrapolating values of the other instrument when using the deterministic approach.

However, by contrast, when the scenario module 115 applies the stochastic approach, the interdependencies of the set of instruments are extrapolated across the set of instruments to realize fully how the scenario influences the values. Thus, scenario forecasts 150 generated when the scenario module 115 applies the stochastic computerized algorithm account for the additional interdependencies and thus may provide a more robust projection of future values for the set of instruments. In this way, the scenario forecasts 150 are generated to analyze effects on the set of instruments associated with an occurrence(s) of the scenario(s).

Continuing with method 200, at 270, the scenario forecasts 150 are stored. In one embodiment, the scenario forecasts 150 are stored in the data store 125 by, for example, generating a request, allocating memory space, communicating the scenario forecasts 150 over a bus to a memory controller, and finally writing the scenario forecasts into memory.

By storing the scenario forecasts 150 in the processing table in the memory along with the primary forecasts 145, the forecasts are organized together to permit comparisons between the scenario forecasts 150 and the primary forecasts 145. That is, for example, storing the forecasts in the memory stores the forecasts together in a single graph and/or graphical user interface (GUI) that provides for directly comparing the forecasts on a same graph when accessed by a user from the remote device 160. Additionally, the scenario forecasts 150 may be stored in the electronic database 130 to persist the scenario forecasts 150 for longer periods. That is, the scenario module 115 stores the scenario forecasts 150 in the electronic database 130 so that the scenario forecasts may be used at a later time to, for example, produce visualizations using graphical user interfaces (GUIs), compare with subsequently produced forecasts, generate reports, forecast further changes to the scenario according to the scenario forecasts and so on. Moreover, the scenario forecasts 150 stored in the electronic database 130 may be subsequently read from the electronic database 130 and used to produce modified versions of the forecasts 150 according to further scenario variables or modification of variables already present in the forecasts 150. In this way, each of the scenario forecasts provides for more efficient production of forecasts from being readily available for modification without, for example, producing wholly new forecasts.

As one example of compounding scenarios, consider the scenario forecasts 150 that are stored at 270. In one embodiment, the scenario module 115 repeats method 200 starting at block 250 using a previously stored one of the scenario forecasts 150 in place of the primary forecast 145. That is, new scenario variables 155 are received at 250 that define an additional scenario. Subsequently, at 260, a previously generated one of the scenario forecasts 150 is modified. For example, the new scenario variables 155 are applied by the scenario module 115 to the scenario forecast 150 to alter how the projected values 140 previously modified in the scenario forecast 150 are extrapolated over the time series. In this way, additional scenarios can be compounded onto previous scenario forecasts that account for other scenarios.

Furthermore, at 280, the scenario forecasts 150 and the primary forecasts 145 are transmitted to the remote device 160. In one embodiment, the forecasts 145 and 150 are provided to the remote device 160 in response to the remote device 160 initially providing the trigger signal at 210 and/or providing the scenario variables at 250. Accordingly, the scenario module 115 causes the processor 110 to transmit the forecasts 145 and 150 back to the remote device 160 causing the remote device 160 to display the forecasts 145 and 150 in the GUI on a display 165 for comparison in a single display.

Additionally, in one embodiment, the scenario module 115 causes the processor 110 to transmit the forecasts 145 and 150 by creating an interactive GUI, embedding the forecasts 145 and 150 within the GUI, transferring the GUI to a network interface card, encoding a communication that embodies the GUI, buffering the communication, and transmitting the communication over the network 105 to the remote device 160 to cause the remote device 160 to display the GUI.

As a result of the scenario module 115 implementing the method 200 as a computerized algorithm, the computing system 100 computes and generates the forecasts 145 and 150 as diagnostic tools for assessing profitability and risks of the set of instruments in relation to possible future events. Thus, the scenario module 115 produces the forecasts 145 and 150 to assist in controlling decisions about future risks in relation to the set of instruments for the account.

Computing Device Embodiment

Figure 3:
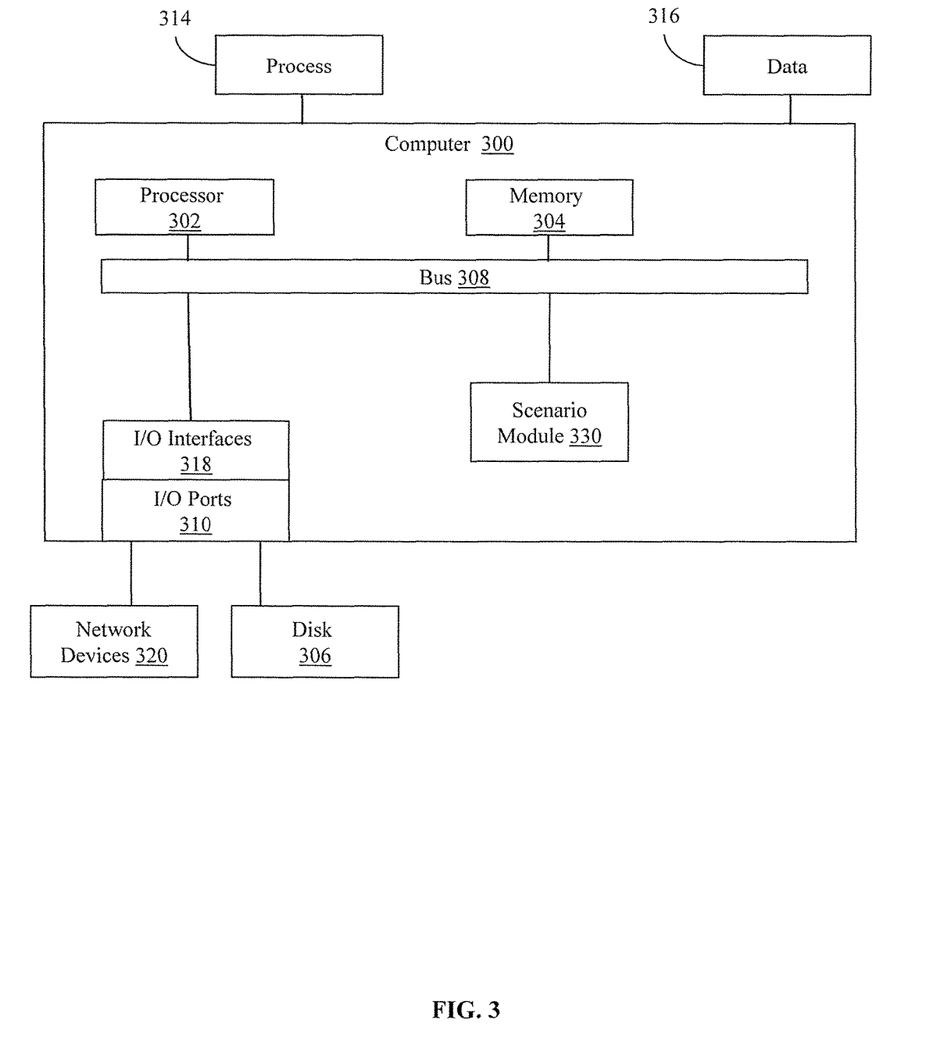
FIG. 3 illustrates an embodiment of a computing system configured with the example systems and/or methods disclosed.

FIG. 3 illustrates an example computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 may include scenario module 330 configured to facilitate computing primary forecasts from historic values of instruments and generating scenario forecasts to model affects of scenarios on the set of instruments. In different examples, the scenario module 330 may be implemented in hardware, a non-transitory computer-readable medium with stored instructions, firmware, and/or combinations thereof. While the scenario module 330 is illustrated as a hardware component attached to the bus 308, it is to be appreciated that in other embodiments, the scenario module 330 could be implemented in the processor 302, stored in memory 304, or stored in disk 306.

In one embodiment, scenario module 330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to aggregate historic values of instruments, compute forecasts using the historic values, and forecast scenarios according to the historic values. The means may also be implemented as stored computer executable instructions that are presented to computer 300 as data 316 that are temporarily stored in memory 304 and then executed by processor 302.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output (I/O) interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD-ROM, and so on. The memory 304 can store a process 314 and/or data 316, for example. The disk 306 and/or the memory 304 can store an operating system that controls and allocates resources of the computer 300.

The computer 300 may interact with input/output (I/O) devices via the I/O interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the I/O interfaces 318, and/or the I/O ports 310. Through the network devices 320, the computer 300 may interact with a network. Through the network, the computer 300 may be logically connected to remote computers. Networks with which the computer 300 may interact include, but are not limited to, a LAN, a WAN, and other networks.

Definitions and Other Embodiments

In another embodiment, the described methods and/or their equivalents may be implemented with computer-executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smartphone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term, and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or another computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer-storage medium," as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

An "operable connection," or a connection by which entities are "operably connected," or "communicably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both." When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing instructions that when executed by one or more processors of a computing device cause the computing device to perform at least:

in response to receiving a signal that triggers the computing device to initiate data collection, collecting electronic data from one or more electronic databases by aggregating the electronic data into data structures of a processing table, wherein the electronic data defines historic values of a set of instruments that are different measures for an electronic account;

computing projected values for each of the set of instruments according to correlations identified in the historic values, wherein the projected values form primary forecasts that model expected future values of the set of instruments;

in response to receiving electronic inputs including scenario variables of a scenario that affects the primary forecasts, generating scenario forecasts for the set of instruments according to the scenario variables and the projected values to identify how the scenario influences the primary forecasts; and transmitting the primary forecasts and the scenario forecasts to a remote device to cause the remote device to display the primary forecasts along with the scenario forecasts on a graphical user interface (GUI) that provides the primary forecasts and the scenario forecasts for comparison in a single display.

2. The non-transitory computer-readable medium of claim 1, wherein the instructions that cause the computing device to perform the generating of the scenario forecasts include instructions that cause the computing device to perform:

modifying coefficients determined from the computing according to the scenario variables, and generating values of the scenario forecasts according to the modified coefficients and interdependencies identified by the primary forecasts between the set of instruments using a stochastic algorithm.

3. The non-transitory computer-readable medium of claim 1,
wherein the historic values include past trends in values of the set of instruments,
wherein the set of instruments are financial instruments that summarize profitability for separate portions of the account, and
wherein the instructions that cause the computing device to perform the computing of the primary forecasts include instructions that cause the computing device to perform:
generating the projected values over a time series for each of the set of instruments that indicates a time period and frequency of data points for the primary forecasts.

4. The non-transitory computer-readable medium of claim 1, wherein the instructions that cause the computing device to perform the computing include instructions that cause the computing device to perform the computing of the primary forecasts by using the historic values as an input to an autoregressive integrated moving average (ARIMA) model that extrapolates the projected values according to calculated coefficients that characterize patterns in the historic values of the set of instruments.

5. The non-transitory computer-readable medium of claim 1, wherein the instructions that cause the computing device to perform the collecting include instructions that cause the computing device to perform identifying that the electronic data is related to at least one of the set of instruments for the account when collecting the electronic data from the one or more electronic databases.

6. The non-transitory computer-readable medium of claim 1, wherein the scenario variables are electronic data inputs stored in electronic data structures that represent stressors on the set of instruments, wherein the scenario variables cause the computing device to alter how the projected values are extrapolated over a time series as caused by an occurrence of the scenario when generating the scenario forecasts.

7. The non-transitory computer-readable medium of claim 1, further comprising instructions that cause the computing device to perform at least:
storing, in the processing table in a memory, the scenario forecasts and the primary forecasts to organize comparisons between the scenario forecasts and the primary forecasts, wherein the scenario forecasts are generated to analyze effects on the set of instruments associated with an occurrence of the scenario.

8. A computing system, comprising:
a processor;
a non-transitory memory communicably coupled with the processor and storing at least a scenario module including instructions that when executed by the processor cause the processor to:
in response to receiving a signal that triggers the processor to initiate data collection, collect electronic data from one or more electronic databases by aggregating the electronic data into data structures of a processing table, wherein the electronic data defines historic values of a set of instruments that are different measures for an account;
compute projected values for each of the set of instruments according to correlations identified in the historic values, wherein the projected values form primary forecasts that model expected future values of the set of instruments;
in response to receiving electronic inputs including scenario variables of a scenario that affects the primary forecasts, generate scenario forecasts for the set of instruments according to the scenario variables and the projected values to identify how the scenario influences the primary forecasts; and
transmit the primary forecasts and the scenario forecasts to a remote device to cause the remote device to display the primary forecasts along with the scenario forecasts on a graphical user interface (GUI) that provides the primary forecasts and the scenario forecasts for comparison in a single display.

9. The computing system of claim 8, wherein scenario module is configured to generate the scenario forecasts by:
modifying coefficients determined from computing the projected values using the scenario variables, and
generating values of the scenario forecasts according to the modified coefficients and interdependencies identified by the primary forecasts between the set of instruments using a stochastic algorithm.

10. The computing system of claim 8,
wherein the historic values include past trends in values of the set of instruments,
wherein the set of instruments are financial instruments that summarize profitability for separate portions of the account,
wherein the scenario module is configured to compute the projected values by generating the projected values over a time series for each of the set of instruments, and
wherein the time series indicates a time period and frequency of data points for the primary forecasts.

11. The computing system of claim 8,
wherein the scenario module is configured to compute of the primary forecasts by using the historic values as an input to an autoregressive integrated moving average (ARIMA) model that extrapolates the projected values according to calculated coefficients that characterize patterns in the historic values of the set of instruments, and
wherein the scenario module is configured to collect the historic values by identifying that the electronic data is related to at least one of the set of instruments for the account.

12. The computing system of claim 8,
wherein the scenario variables are electronic data inputs that represent stressors on the set of instruments,
wherein the scenario module is configured to cause the processor to alter how the projected values are extrapolated over a time series according to the scenario variables to model an occurrence of the scenario.

13. A computer-implemented method, the method comprising:
in response to receiving, in a computing device, a signal that triggers data collection, collecting electronic data from one or more electronic databases by aggregating the electronic data into data structures of a processing table, wherein the electronic data defines historic values of a set of instruments that are different measures for an account;
computing projected values for each of the set of instruments according to correlations identified in the historic values, wherein the projected values form primary forecasts that model expected future values of the set of instruments;

in response to receiving electronic inputs including scenario variables of a scenario that affects the primary forecasts, generating scenario forecasts for the set of instruments according to the scenario variables and the projected values to identify how the scenario influences the primary forecasts; and transmitting the primary forecasts and the scenario forecasts to a remote device to cause the remote device to display the primary forecasts along with the scenario forecasts on a graphical user interface (GUI) that provides the primary forecasts and the scenario forecasts for comparison in a single display.

14. The computer-implemented method of claim 13, wherein generating the scenario forecasts includes:

modifying coefficients determined from the computing according to the scenario variables, and generating values of the scenario forecasts according to the modified coefficients and interdependencies identified by the primary forecasts between the set of instruments using a stochastic algorithm.

15. The computer-implemented method of claim 13, wherein the historic values include past trends in values of the set of instruments, wherein the set of instruments are financial instruments that summarize profitability for separate portions of the account, and wherein computing includes generating the projected values over a time series for each of the set of instruments that indicates a time period and frequency of data points for the primary forecasts.

16. The computer-implemented method of claim 13, wherein the scenario variables are electronic data inputs stored in electronic data structures that represent stressors on the set of instruments, wherein the scenario variables cause the computing device to alter how the projected values are extrapolated over a time series as caused by an occurrence of the scenario when generating the scenario forecasts.

17. The computer-implemented method of claim 13, wherein the instructions that cause the computing device to perform the computing include instructions that cause the computing device to perform the computing of the primary forecasts by using the historic values as an input to an autoregressive integrated moving average (ARIMA) model that extrapolates the projected values according to calculated coefficients that characterize patterns in the historic values of the set of instruments.

* * * * *